UNITED STATES PATENT OFFICE.

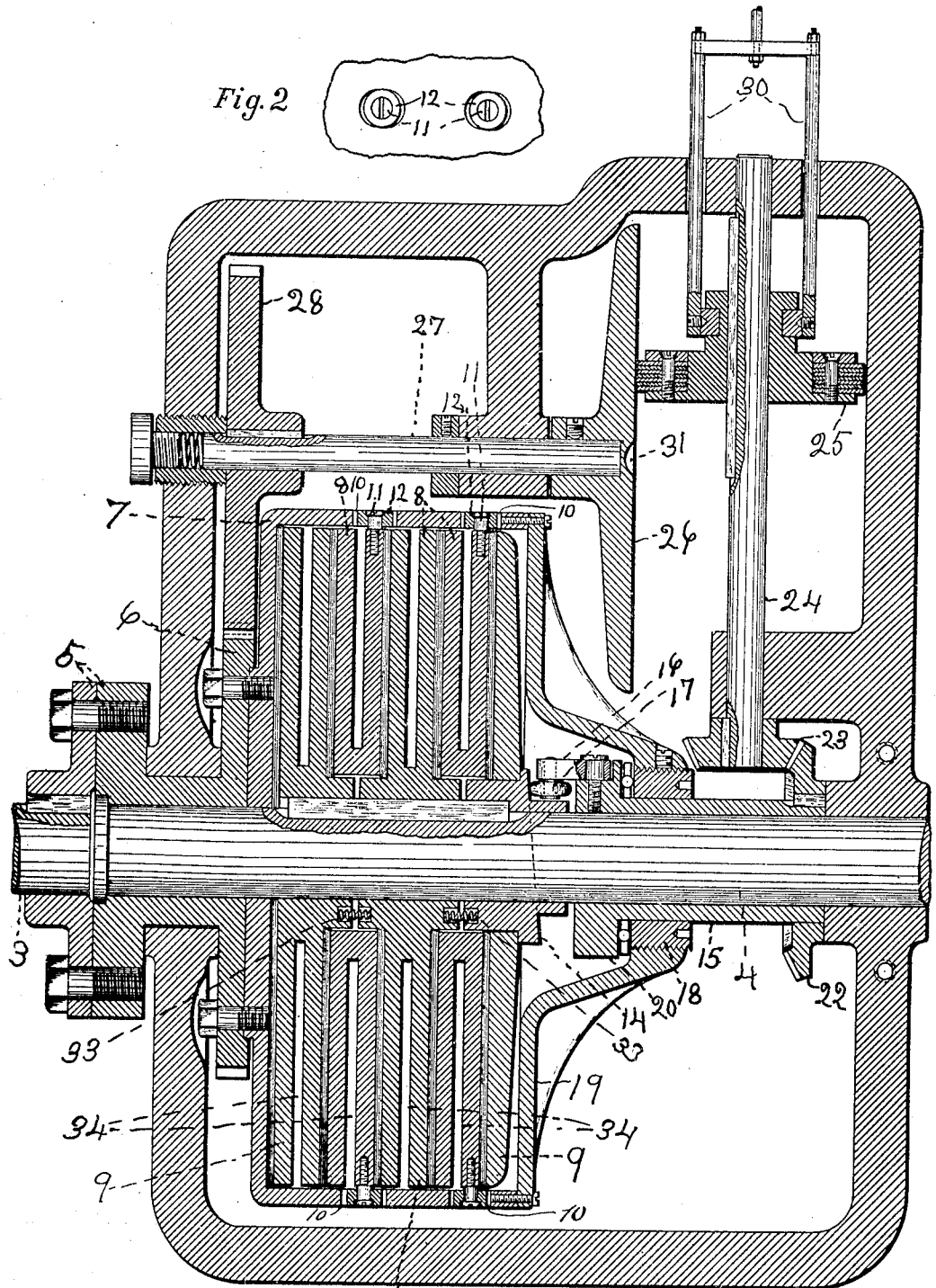

NILS CHRISTENSON, OF LYNN, MASSACHUSETTS, ASSIGNOR TO CALVIN B. TUTTLE, OF LYNN, MASSACHUSETTS; ANNA M. TUTTLE AND HELEN M. MARSH ADMINISTRATRICES OF SAID CALVIN B. TUTTLE, DECEASED.

VARIABLE-SPEED DRIVING MECHANISM.

No. 871,753.   Specification of Letters Patent.   Patented Nov. 19, 1907.

Application filed February 25, 1904. Serial No. 195,156.

*To all whom it may concern:*

Be it known that I, NILS CHRISTENSON, of Lynn, county of Essex, and Commonwealth of Massachusetts, have invented certain Improvements in Variable-Speed Driving Mechanism, of which the following, read in connection with the accompanying drawings, is a specification.

This invention has for its object to provide a variable speed driving mechanism for general use and having special adaptation for use in motor vehicles.

The invention, as shown, involves the constituent elements of a friction clutch and variable speed and power mechanisms, and relates to means for adjusting the amount of slip and travel of the clutch elements relatively, and for automatically maintaining any such relation after it is determined, and for automatically varying and suspending and restoring friction between the clutch elements and to matters of minor import, all of which are more fully described and claimed hereinafter.

In the mechanism represented, a friction clutch is employed between the driving and driven members, one element of such clutch, being connected with the driven member, is connected with a cam surface. With this cam surface coöperates a thrust element mounted to rotate about the same axis as said clutch element. The thrust element is rotated by mechanism which, preferably, is adjustable so that the speed of the thrust element can be controlled at will.

The direction of rotation of the thrust element, and the cam surface on the clutch element are so arranged that the rotation of the thrust element relative to the clutch element forces the clutch element against a coöperating clutch driving element, and thus throws the clutch into operation by creating pressure between the driving and driven elements thereof. When this occurs the clutch driven element begins to rotate in the same direction and with speed equal to that of the thrust element, this speed being automatically maintained as stated hereinafter. The speed of said driven clutch element and consequently the speed of the driven member can be varied by simply varying the speed at which the thrust member is rotated.

In the drawings, Figure 1, is a central sectional view showing the apparatus, and Fig. 2 is a detached detail thereof.

The driving and driven members may be of any shape or form, and as herein illustrated are in the form of shafts. It will be understood, of course, that the driving member 3 is driven from any suitable means and that the driven member 4 may be connected to any part which it is desired to drive or rotate.

Fast to the driving shaft 3 is a coupling member 5 in which one end of the driven member 4 is journaled, said coupling member having integral therewith a gear 6 from which the thrust element, hereinafter described, is driven. Rigid with the coupling member 5 and with the gear 6 is one element of a friction clutch, the other elements of said clutch being connected to the driven member 4. The casing 7 is rigid with the coupling member 5, it being secured to one face of the gear 6, and has projecting inwardly therefrom a plurality of friction disk-elements 8 carried by the casing. The elements 8 coöperate with other friction disk-elements 9, alternately arranged, which are keyed to the driven shaft 4. The disk-elements 8 are connected to the casing 7 so as to rotate therewith, but are permitted a slight movement in the direction of the axis of rotation relatively to said casing. This is herein accomplished by providing each of the elements at its periphery with projections 11, which engage slots 10 in the casing 7. To reduce friction, I prefer to mount on the projections 11 the anti-friction rollers 12. The last disk-element 9 has formed upon it the cam surface 14 with which coöperates the thrust element referred to above. In this form of my invention the thrust element is in the form of a sleeve 15 surrounding the driven shaft, and carrying an arm 16 provided with a roller 17 situated to engage the cam surface 14. The thrust element is journaled in a bearing sleeve 18 carried by the head 19 of the casing, said thrust element having the flange 20 which engages the bearing and thus limits longitudinal movement of the thrust element. Anti-friction rollers may be employed between the flange and bearing if necessary.

The thrust element is loosely mounted upon the driven shaft and is rotated, in the present instance from the driving shaft, by some suitable mechanism. As represented here the thrust element has fixed thereto a beveled gear 22, which meshes with the beveled gear 23 carried by the shaft 24. Splined to this shaft is a friction roller 25 adapted to engage and coöperate with a friction disk 26 which is fast upon a shaft 27. Shaft 27 has fast thereon a gear 28, which meshes with the driving gear 6. With this construction it will be seen that the thrust element derives its rotation from the driving element.

The friction roller 25 can be moved longitudinally of the shaft 24 and thus shifted radially of the friction disk 26 by any suitable means, such as the operating mechanism 30. The mechanism operates as follows. When the driven member is at rest, the friction roller 25 is located at the center of disk 26 and registers with the concaved portion 31 of said disk. With the parts in this position, rotation of the driving member 3 merely rotates the casing 7, the friction disk-elements 8 of the clutch and the disk 26. The elements 8 and 9 of the clutch being separated by means of the springs 33, no power is transmitted and the disk-element 9, the driven member and thrust element remain stationary.

To start the driven member 4, the friction roller 25 is moved outwardly or radially onto the face of the friction disk 26 and is thereby rotated. The thrust element 15 is consequently rotated, the rotation is in such direction relative to the cam surface 14 that the element 9 at the right is moved toward the left and a coupling pressure is applied to the clutch. When the coupling pressure reaches a sufficient amount of friction between the elements 8 and 9 it causes the element 9 to rotate, thus rotating the driven member 4 and its load. If the rotation of the right hand clutch element 9 and consequently of the driven member 4 is slower than that of the thrust element, said thrust element will advance relatively to the clutch element 9, and, by its coaction with the cam surface 14 increase the coupling pressure of the clutch, less than a single turn of the thrust element relative to the element 9 being sufficient to apply the entire grip of the clutch. If the speed of the driven member increases beyond that of the thrust member carrying forward the clutch element 9 such movement releases the cam 14 from the thrust element, thereby releasing the grip of the clutch and consequently suspending the exertion of force on the driven member. Such force is automatically restored whenever the speed of the driven member falls back to the predetermined proportionate speed of the driving member, at which the thrust member is set to revolve, thereby reengaging the clutch element and the thrust element for restoring friction between the clutch elements. The speed of the thrust element 15 and the disk 26 will remain unchanged relatively so long as the roller 25 remains unchanged in relation to the axis of rotation of the disk 26, and the disk 26 being rotated from the driving member 3 will participate proportionately in all variations in the speed of the driving member, so that the speed of the thrust element and consequently the speed of the driven member are always the same or some proportionate of the driving member, and the proportion may be varied by suitably varying the position of the roller 25 on disk 26. Any proportionate speed once determined by the position of roller 25 on the disk 26 is maintained automatically thereafter until changed by the operator, and is controllable by the operator at all times while the mechanism operates. So that in case of a motor vehicle, the operator may determine at what speed of the driving member it is desirable for the driven member to travel and relatively arrange the roller 25 on disk 26 for such speed, after which the driven member maintains that proportionate speed regardless of variations in the load or in the amount of friction between the clutch elements, the mechanism being automatic for all purposes except for changing the amount of slip or speed variance between the elements of the clutch and, consequently, the driving and driven members.

The construction is such as to automatically maintain the amount of friction between the clutch driving and driven elements for, at all times, rotating the driven member at the same speed as the thrust element is rotated. The speed of the thrust element and consequently the speed of rotation of the driven member may be controlled at will relatively to the driving member.

A plurality of friction elements are employed because of the greater area of friction surface presented thereby. But I do not wish to be limited thereto. The particular clutch construction may be varied in many ways without in any sense departing from the spirit of my invention. The same applies to the form of thrust element and variable speed mechanisms shown herein for driving the same.

What I claim to be of my invention is

1. The combination with a driving and driven member, of a friction clutch, the clutch comprising non-fluid members, carried by the driving and driven members respectively, and means actuated by the driving member and at a speed lower than the speed of the driving member and means to operate said first means for causing a frictional engagement of the non-fluid clutch members.

2. In a variable speed device, the combination with driving and driven members and a non-fluid friction clutch, the driving and driven elements of which are carried by the driving and driven members respectively, of a clutch operating mechanism comprising an element connected with and traveling at speed slower than the speed of the driving member, the traveling element normally engaging one of the clutch elements and operating by means of relative movement between itself and clutch element for actuating the clutch and for suspending and restoring frictional engagement between the clutch elements.

3. The combination with a driving and a driven member, of a non-fluid friction clutch comprising a driving and driven element carried by the driving and driven members respectively, a traveling member driven from the driving member and co-acting with one of the clutch elements for varying the amount of friction between the elements, and means for varying and maintaining the amount of speed difference between the traveling member and driving member, the clutch being operated by the relative movement of the traveling member and the co-acting clutch element to increase and decrease and suspend and restore the frictional engagement of the clutch elements.

4. The combination of a driving member, a driven member, friction clutch means between the members comprising a friction element connected and rotating with the driven element, a cam surface carried by the friction element, a thrust element rotatable about the axis of said friction element and coacting with the cam surface thereon, and means to rotate and preserve speed difference between said thrust element and the driving member.

5. The combination of a driving element, a driven element, friction clutch means operatively connecting the members, such means comprising a friction element connected with the driven member, a cam surface carried by the friction element, a thrust element rotatable about the axis of said friction element and co-acting with the cam surface thereon, means to rotate said thrust element from the driving member, and means to vary at will the speed of rotation of said thrust element.

6. In a variable speed device, a driving member, a driven member, friction clutch means between the members and comprising a friction element connected with the driven member, a cam surface on the friction element, a thrust member rotatable about the axis of said friction element and coacting with the cam surface thereon, and means to rotate said thrust element at will, at variable speed.

7. In a variable speed mechanism, a driving member, a driven member, and power transferring elements which simultaneously connect the members operatively and vary rotatively one with another to give the members different speeds, combined with mechanism active for varying the power transmitted through said elements to the driven member and for maintaining a relation of speed difference between the members regardless of such variation in power.

8. In a variable speed mechanism, a driving member, a driven member, and power transferring elements which simultaneously connect the members operatively and relatively vary rotatively to give the members different speeds, combined with mechanism active for varying the power transmitted through said elements to the driven member whenever the load varies, and for maintaining a relation of speed difference between the members regardless of such variance in power.

9. In a variable speed mechanism, a driving member, a driven member, and power transferring elements which simultaneously connect the members operatively and relatively vary rotatively to give the members different speed, combined with mechanism active for varying the power transmitted through said elements to the driven member and for maintaining a relation of speed difference between the members regardless of such variation in power, and means controllable for varying the amount of speed difference between the members.

10. In a friction clutch mechanism, in combination, driving and driven clutch elements, non-fluid means including a line of normally connected variable speed driving media, for creating frictional grip between the elements, a member of said media being controlled by the driven element so that the continuity of said media becomes broken by the driven element traveling in advance of a proportionate speed of the driving element, and restored by the driven element returning to such proportionate speed.

11. In a friction clutch device, the combination of driving and driven clutch elements, a rotative element, clutch operating means controlled through the element, means for driving the element at speed proportionate to the speed of a clutch element, and means to determine and vary at will the proportionate speed relation between the rotative element and clutch element.

12. The combination with a friction clutch, of clutch operating means comprising a rotatable element, and means for driving and preserving a relation of speed difference between said element and a clutch element and for varying the amount of said difference at will.

13. The combination with a friction clutch, of driving and driven clutch elements clutch operating mechanism comprising a rotatable element, means for driving and varying the speed of rotation of the rotatable element and means controlled by a variance in the speed of rotation of said element for varying the speed of rotation of a clutch element.

14. The combination with a friction clutch, of clutch operating mechanism, said mechanism comprising a rotatable element, means for driving and for varying the speed of the rotatable element and means controlled by a variance in the speed of rotation of said element for varying the speed of rotation of a clutch element to a corresponding amount.

15. The combination with a friction clutch, of clutch operating mechanism comprising a rotatable element, means for driving the element at different speeds and means controlled by a variance in the speed of rotation of said element for varying the speed of rotation of a clutch element, and means for manually varying the speed of rotation of said rotated element, at will.

16. The combination in a friction clutch of driving and driven clutch elements, actuative media including means traveling at speed less than the driving element of the clutch and operated by relative movement rotatively between said means and a clutch element said element controlling a part of the actuative means, the means active for suspending friction between the driving and driven clutch elements when the travel of said means and the element vary in one direction, and active for restoring the friction between the elements when said travel varies in the other direction.

17. The combination with a friction clutch, of driving and driven clutch elements, rotative clutch operating means, actuative mechanism for rotating the means and preserving difference between the speeds of the means and the clutch driving element, the means being connected to the driven element in part and active for suspending friction between the driving and driven elements when the travel of the driven element exceeds the travel of the other part of said means.

18. The combination in a friction clutch, of driving and driven clutch elements, means rotated at speed continuously less than the speed of a clutch element, operated by a relative movement rotatively between said means and a clutch element in one direction for suspending friction between the driving and driven elements, and operated by relative movement rotatively between said means and the clutch element in the opposite direction for restoring the friction between said driving and driven elements, means for rotating the clutch operating means and connections between the operating means and the driven element.

19. The combination in a friction cluthc of driving and driven clutch elements, means rotated at speed less than the speed of the driving element active for suspending friction between the clutch driving and driven elements when the difference in travel between said elements diminishes below the difference in travel between said means and the driving element, means for driving the rotated element and maintaining the proportionate speed relation between the clutch operating means and the driving element and connections between the operating means and driven element.

20. The combination in a friction clutch of driving and driven elements, means for operating the clutch comprising a rotated element and means for driving such element, said means adapted to operate the clutch for maintaining a relation of slip between the driving and driven elements of the clutch, and for suspending the friction between said elements when the difference in travel between the elements diminishes below the difference in travel between said rotated element and the driven element of the clutch, and means for preserving a difference in travel between the rotated element and the driving element.

21. In a friction clutch mechanism, in combination, driving and driven clutch elements, a traveling member, means for driving and preserving speed difference between the member and one of said elements, and means operating through the member to control the amount of grip between the elements.

22. In a friction clutch mechanism, in combination, driving and driven clutch elements, a traveling member, a friction controlled means for driving and preserving speed difference between the member and one of said elements and operating through the member for controlling the grip of the clutch.

23. In a friction clutch mechanism, in combination, driving and driven clutch elements, a traveling member, means for driving and preserving speed difference between the member and one of said elements, means for varying the amount of speed difference between the member and element, and means operating through the member to control the clutch.

24. In a friction clutch device, in combination, driving and driven clutch elements, a traveling member, means for driving and preserving speed difference between the member and one of said elements, means for varying the amount of such difference at will, and means operating through the member for controlling the clutch.

25. In a friction clutch mechanism, in combination, driving and driven clutch elements, a traveling member, means for driving and preserving speed difference between the member and one of said elements, clutch operating means controlled through the member for producing friction grip between the elements and controlled by the driven element traveling in advance of the traveling member for suspending the grip between the elements.

26. In a friction clutch mechanism, in combination, driving and driven clutch elements, a traveling member, means for driving and preserving speed difference between the member and one of said elements, a part carried by the member, a coöperative part carried by the other element, and said means operating to vary the parts relatively for controlling the clutch grip.

27. In a friction clutch mechanism, in combination, driving and driven clutch elements, means for producing grip and speed difference between the elements, and preserving the speed difference unchanged regardless of variance in the amount of grip.

28. In a friction clutch mechanism, in combination, driving and driven clutch elements, means for producing grip and speed difference between the elements, and preserving the speed difference unchanged regardless of variance in the amount of grip, and means for varying the speed difference.

29. In a friction clutch mechanism, in combination, driving and driven clutch elements, means for producing grip and speed difference between the elements, and preserving the speed difference unchanged regardless of variance in the amount of grip, and manually controlled means for varying the speed difference.

30. In a friction clutch mechanism, in combination, driving and driven clutch elements, means for producing grip and speed difference between the elements, and preserving the speed difference unchanged regardless of variance in the amount of grip, and means for varying the speed difference at will.

31. In a friction clutch mechanism, in combination, driving and driven clutch elements, means for producing grip and speed difference between the elements, and varying the grip with the variance of load, and preserving the speed difference unchanged regardless of variance in the grip.

32. In a friction clutch mechanism, in combination, driving and driven clutch elements, means for producing speed difference and grip between the elements equal with the load, and for preserving the speed difference unchanged and varying the grip to suit the variance of load in either direction.

33. In a friction clutch mechanism, in combination, driving and driven clutch elements, a traveling member, means for driving the member, means operating through the member to produce speed difference and grip between the elements and for preserving the speed difference unchanged regardless of a variance of grip.

34. In a friction clutch device, driving and driven clutch elements, means for producing grip and slip between the elements, and for varying the amount of grip without varying the amount of slip and for suspending the grip when variance of the members relatively is less than the amount of slip.

35. In a friction clutch device, driving and driven elements, means for producing grip and slip between the elements and proportionating the amount of slip to the travel of the driving element, and for suspending grip between the elements when variance of the elements relatively is less than the amount of slip and for restoring the grip when variance of the elements relatively becomes equal again to the amount of slip.

36. In a variable speed mechanism, a driving member, a driven member, drive elements connecting the members and relatively varying rotatively to give the members different speeds, a traveling element, means to drive the element at different speeds, and means controlled by variance in the speed of rotation of said element for relatively governing said drive elements rotatively.

37. In a variable speed mechanism, a driving member, a driven member, drive elements connecting the members and relatively varying rotatively to give the members different speeds, a traveling element, means to drive the element, means controlled by varying the speed of rotation of said element for relatively governing said drive elements rotatively, and means for changing the speed of rotation of the element at will.

Signed by me at Lynn, Massachusetts this 23rd day of February, 1904.

NILS CHRISTENSON.

Witnesses:
 A. M. TUTTLE,
 HELEN M. MARSH.